United States Patent [19]

Palm

[11] Patent Number: 5,050,307

[45] Date of Patent: Sep. 24, 1991

[54] WOBBLE PLATE DRIVE

[75] Inventor: Bernhard Palm, Brookfield, Wis.

[73] Assignee: Milwaukee Electric Tool Corporation, Del.

[21] Appl. No.: 622,431

[22] Filed: Dec. 5, 1990

Related U.S. Application Data

[63] Continuation-in-part of Ser. No. 541,093, Jun. 20, 1990, which is a continuation-in-part of Ser. No. 487,219, Mar. 1, 1990.

[51] Int. Cl.[5] ............................................. B23D 49/04
[52] U.S. Cl. ..................................................... 30/392
[58] Field of Search ................................. 30/392–394, 30/275, 277.4, 210; 74/53, 54, 61

[56] References Cited

U.S. PATENT DOCUMENTS

| | | | |
|---|---|---|---|
| 3,461,732 | 8/1969 | Gregory | 30/393 X |
| 3,585,719 | 6/1971 | Kivela | 30/392 |
| 4,114,270 | 9/1978 | Jamsen-Herfeld et al. | 30/394 |

Primary Examiner—Douglas D. Watts
Attorney, Agent, or Firm—Michael, Best & Friedrich

[57] ABSTRACT

The reciprocating saw incorporates a counterbalanced reciprocating drive having a jackshaft on which primary and secondary wobble plates are mounted. The wobble plates drive a reciprocating saw spindle and a concentric counterweight in opposite directions to cancel out the induced vibrations. The spindle reciprocates in a bearing sleeve having a slot through which the primary wobble arm projects to drive the spindle. The primary wobble arm projects through a longitudinal slot in the spindle and engages the opposite side of the spindle so the spindle cannot rotate as it reciprocates. The counterweight slides on the outside of the sleeve and has a slot which slides over the primary arm. The secondary arm drives the counterweight. The arms are out of alignment to permit their strokes to overlap without collision. The wobble plates are angled out of 180° so the spindle and counterbalance reverse at the same time. The cutting stroke and speed are increased and vibration is insignificant. The spindle drive has utility apart from the counterbalanced drive.

5 Claims, 3 Drawing Sheets

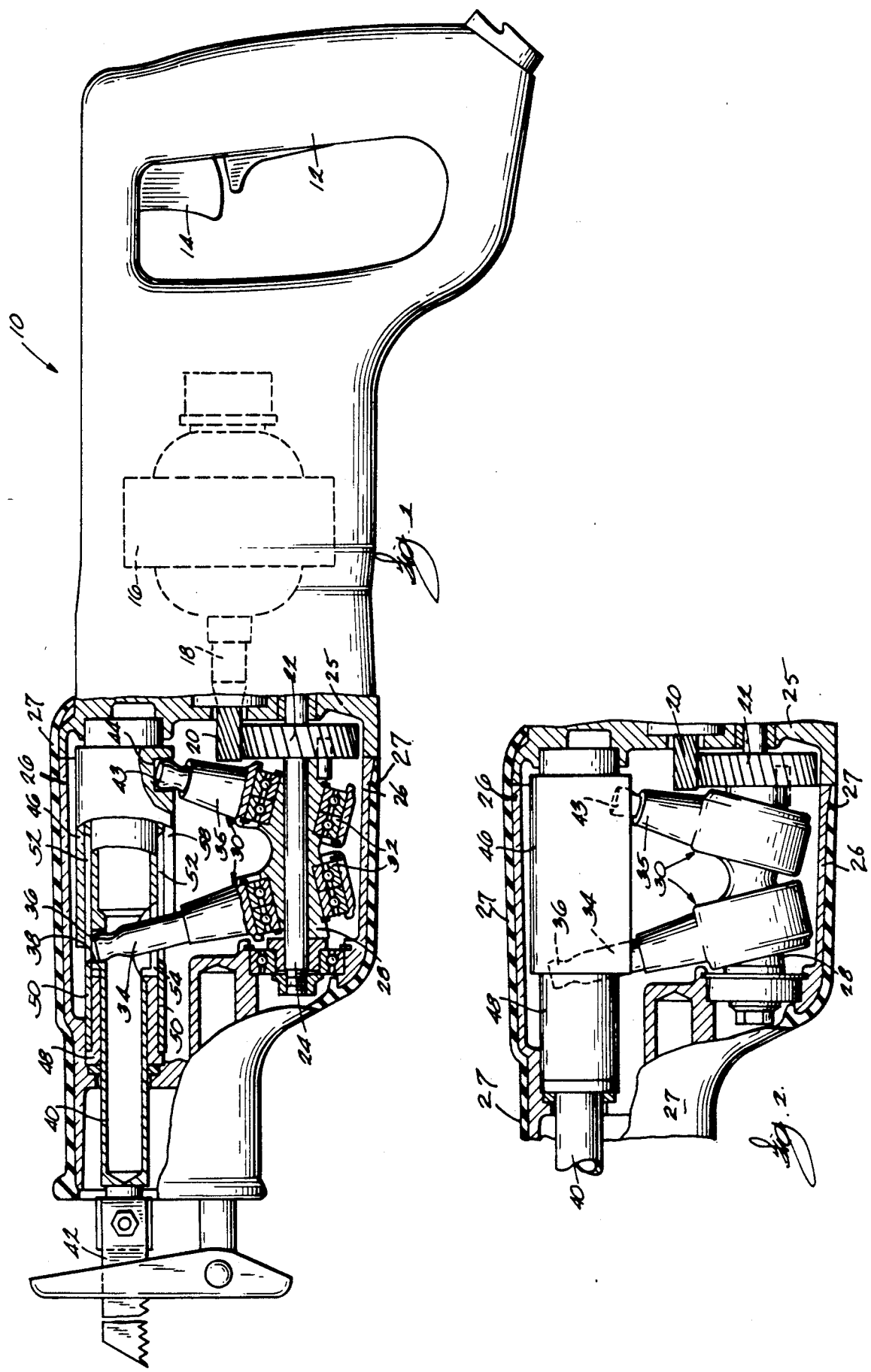

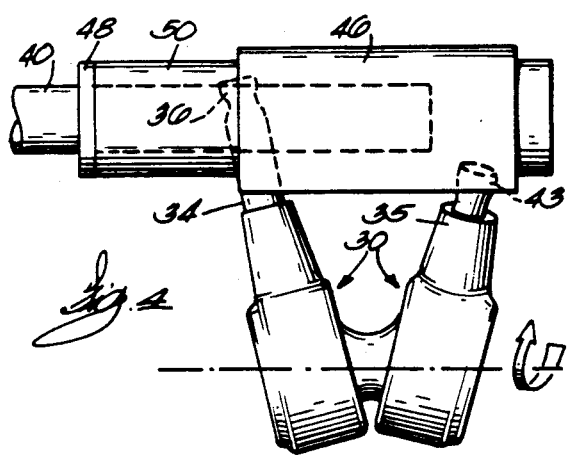
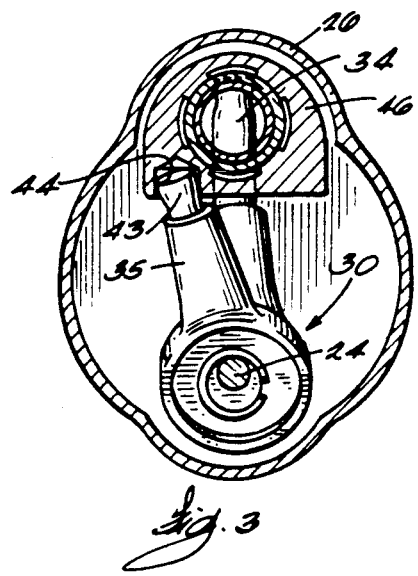
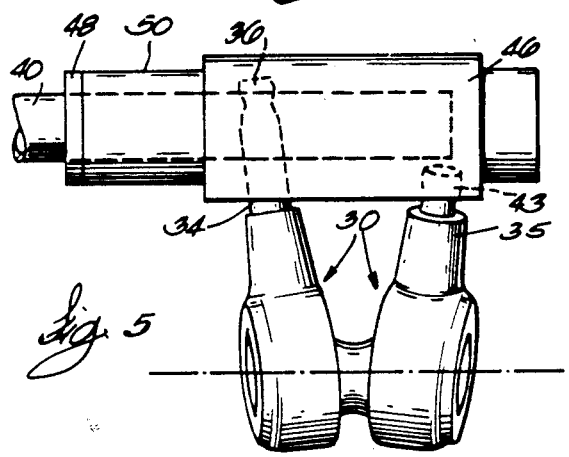
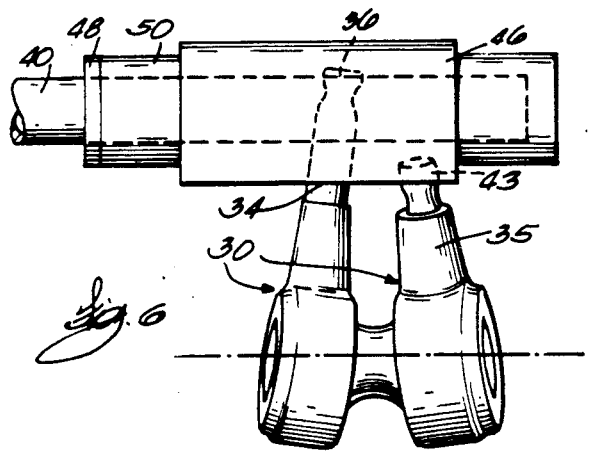
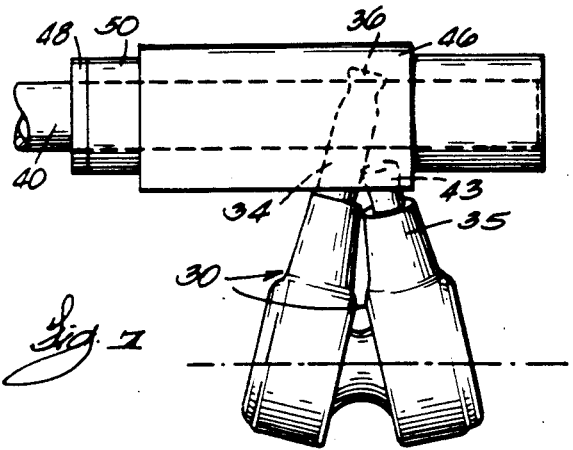

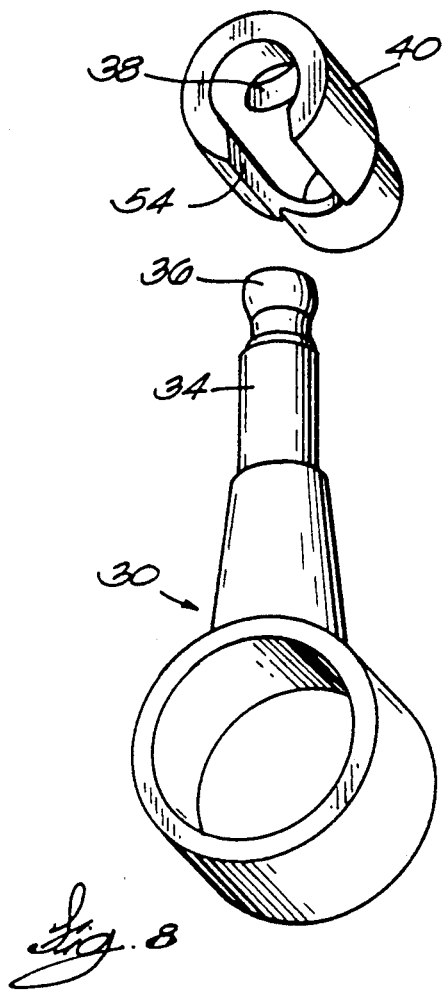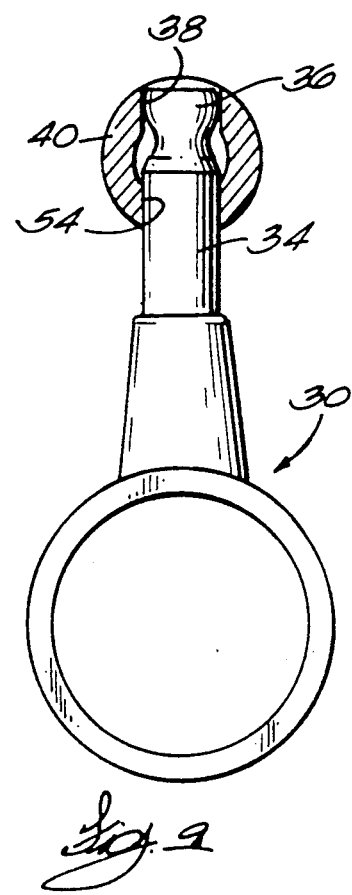

WOBBLE PLATE DRIVE

This application is a continuation-in-part of my copending application Ser. No. 541,093 filed 20 June 1990 as a continuation in part of Ser. No. 487,219 filed 1 Mar. 1990 which shows a saw with a counterbalanced drive using two wobble plates and discloses the present invention but not in as much detail as disclosed herein.

BACKGROUND OF THE INVENTION

Wobble plate drives are used to convert rotary motion to reciprocating motion. The wobble plate drive arm engages the reciprocating spindle. The spindle reciprocates in bearings and the spindle and bearings have had a special non-round cross section so the spindle can be restrained against rotation. This is a costly construction which is very sensitive to wear. In making the cross referenced invention I found I could make the product more compact and less costly by having the drive arm engage the spindle in such a way as to prevent rotation of the spindle.

SUMMARY OF THE INVENTION

This invention provides a wobble plate drive mounted on a rotating shaft and having a drive arm engaging a reciprocating spindle which is mounted in bearings spaced from the axis of the rotating shaft so as to restrain the spindle from rotation; the arm engages the spindle on opposite sides or portions of the spindle axis. The spindle is tubular and is slotted to receive the arm where it passes through the spindle to engage a hole in the far side of the spindle. It is the sliding engagement of the arm in the slot which restrains the spindle from rotation.

This invention provides a compact wobble plate drive for a reciprocating, round spindle which is constrained to non-rotating reciprocating motion by the wobble plate drive arm engaging the spindle. The spindle is tubular and has a longitudinal slot through which the arm projects to engage the opposite portion of the tube. Since the sides of the slot engage the arm the tube cannot rotate. Since the arm engages the portion of the tube most remote from the axis of the wobble plate drive shaft, the axis of the tube is closer to the drive shaft axis than would be the case normally. This results in a more compact drive. The concept of restraining the spindle from rotation by the engagement of the wobble plate drive arm with the spindle is novel and avoids the need for special bearings or other means for restraining the spindle from rotation. This results in a considerable cost saving.

This invention has utility in any wobble plate drive of a reciprocating spindle; it is not dependent on use with a counterbalanced drive. It is shown with a counterbalanced drive simply because the invention was made in conjunction with the counterbalanced drive. The advantages are realized in either a standard or a counterbalanced wobble plate drive.

BRIEF DESCRIPTION OF THE DRAWING

FIG. 1 is a side elevation partly in section showing the present invention.

FIG. 2 is a detail view of a portion of FIG. 1 to give additional perspective to the arrangement of the parts.

FIG. 3 is a section through the right portion of the drive mechanism and looking left in either of FIG. 1 or FIG. 2.

FIGS. 4, 5, 6 and 7 show a series of views extracted from FIG. 2 showing the sequence of operation of the parts going through half of a revolution of the jackshaft.

FIG. 8 is an exploded perspective from below showing the wobble plate and its associated drive arm in exploded relationship to the spindle.

FIG. 9 is an elevation of the wobble plate and drive arm engaging the spindle which is shown in section.

DETAILED DESCRIPTION OF DRAWINGS

As noted above, the present invention is shown in conjunction with a counterbalanced drive but could be used in a simple wobble plate drive which does not incorporate the counterbalance feature.

The in-line counterbalanced reciprocating drive mechanism using two wobble plates can be used in many tools and machines. One wobble plate drives the reciprocating spindle while the other wobble plate drives a counterbalance. The mechanism is shown in a saw.

The in-line saw shown in FIG. 1 is broadly similar to the SAWZALL in-line saw manufactured by applicant's assignee but this construction provides for counterbalancing the forces generated by the reciprocating action and results in a far smoother and far superior product.

The main body 10 of the saw is provided with a handle portion 12 having an on-off switch 14 which controls energization of motor 16. Motor shaft 18 is provided with a drive gear 20 which engages gear 22 mounted on jackshaft 24 journaled in the gear case 26 and diaphragm 25. The gear case 26 is covered by a urethane or rubber insulating "boot" 27 which serves several functions disclosed in detail in my application mentioned above. The jackshaft has a wobble drive member 28 fixed thereon. Two wobble plate assemblies 30 are mounted on drive member 28. Each assembly 30 has an input bearing 32 mounted on wobble plate drive member 28. The left hand wobble plate assembly 30 is the primary assembly while the right hand assembly is the secondary wobble plate. Each assembly 30 has a drive arm engaging the part driven by that assembly. Thus the primary wobble plate has a drive arm 34 having a somewhat spherical tip 36 engaged in a suitable hole 38 in the reciprocating tubular spindle 40 which carries the saw blade 42. The secondary wobble plate has a spherical tip 43 engaging hole 44 in counterweight 46.

Reciprocating spindle 40 slides inside of and is guided by spindle bearing 48 fixed in the gear case. Sleeve 50 is fixed on the outside of bearing 48. Counterweight 46 slides on the outside of sleeve 50. Sleeve 50 is provided with opposed slots 52 and the primary drive arm projects through the bottom slot 52 in sleeve 50, through slot 54 in spindle 40, through the spindle so tip 36 engages the hole 38 in the top of the spindle 40 (see FIG. 1).

Thus the primary wobble plate drive arm 34 projects up through slot 54 in the lower portion of the tubular spindle 40 so the spherical or ball-like distal end 36 of the arm 34 engages the socket or hole 38 in the upper portion of the spindle 40. The sides of the slot 54 in the lower portion of the spindle 40 engage the cylindrical portion of the drive arm 34 and this engagement prevents the spindle from rotating about the spindle axis. Therefore, the spindle can reciprocate in simple bushings and the need for a special non-round shape for the spindle and bearings to prevent spindle rotation is avoided. This results in a considerable cost saving. A further advantage to this construction is that the axis of the spindle 40 is closer to the axis of the wobble plate shaft 24 which results in a more compact product which has aesthetic and functional advantages.

As the primary wobble plate moves arm 34 to the position shown in FIG. 7 the arm and counterweight 46 move in opposite directions and the arm travels to the right in slot 58 in the counterweight. This engagement of arm 34 with the slot 54 (in spindle 40) and slot 58 (in the counterweight) confines travel of the spindle and counterweight to reciprocating action; they cannot rotate. And, since the counterweight can only reciprocate, wobble arm 35 which drives the counterweight can only oscillate through an arc and rotate slightly.

When one considers the sequence of action from FIG. 4 to FIG. 5 to FIG. 6 and then to FIG. 7 it is apparent that arms 34, 35 would strike each other . . . except for the fact the arms are out of alignment as may be seen in FIG. 3. This means that when the arms reach the position of FIG. 7, they do not engage each other. This offset angle would make the forces non-cancelling if the drive inputs to both wobble plate assemblies were 180° out of phase which would be the normal assumption if the forces are to be cancelled. Therefore, the wobble plate drives are offset angularly from the "normal" 180° to thereby compensate for the arms being offset the same angle. This results in cancelling the reciprocating forces and results in a very smooth drive with only minor vibration. This makes it possible to cut more accurately with considerably more comfort to the user.

The counterweight and the spindle are coaxial. Only by having the center of mass of each reciprocating part on the same axis can opposing forces be cancelled without creating other force couples.

The stroke and weight of the counterweight and arm 35 are proportioned to the stroke and weight of the spindle, average saw blade and arm 34 to cancel the forces while providing the spindle and saw blade with a longer stroke. The stroke is increased from 0.75" to 1.25" compared with the SAWZALL saw mentioned before and can be operated at much higher speeds.

I claim:

1. A reciprocating drive mechanism comprising, a housing,
a shaft rotatably mounted in said housing,
means rotating said shaft,
a spindle mounted in said housing for reciprocating motion,
a wobble plate mounted on said shaft and connected to said spindle at opposite sides of the axis of said spindle to restrain said spindle against rotation.

2. A drive mechanism in accordance with claim 1 including,
a guide sleeve mounted in said housing,
an axial slot in said sleeve,
said spindle being slideably mounted in said sleeve,
said primary wobble plate including a drive arm,
said drive arm projecting through said slot in said sleeve to drivingly engage said spindle and being constrained by said slot to motion in a plane including the axes of said spindle and said jackshaft.

3. A reciprocating saw comprising,
a housing including a gear case,
a motor in said housing and having a motor shaft,
a jackshaft rotatably mounted in said housing parallel to said motor shaft,
gearing connecting said motor shaft to said jackshaft,
a primary wobble plate mounted on said jackshaft and including a drive arm,
a spindle mounted in said gear case for reciprocating motion,
said drive arm engaging said spindle on opposite sides of the spindle axis to reciprocate said spindle as said jackshaft is rotated while the engagement of the drive arm with said spindle on opposite sides of said axis restrains the spindle from rotation.

4. A reciprocating saw comprising,
a housing including a gear case,
a motor in said housing and having a motor shaft,
a jackshaft rotatably mounted in said housing parallel to said motor shaft,
gearing connecting said motor shaft to said jackshaft,
a primary wobble plate mounted on said jackshaft and including a drive arm,
a tubular spindle mounted in said gear case for reciprocating motion, said spindle having a longitudinal slot therein on the portion of the spindle closer to said jackshaft,
said drive arm projecting through said slot and being connected to the portion of said spindle opposite said slot on the other side of the axis of said spindle to reciprocate said spindle as said jackshaft is rotated,
the engagement of said drive arm with the sides of said slot acting to restrain said spindle from rotation.

5. A reciprocating saw in accordance with claim 4 including a guide sleeve mounted in said housing,
an axial slot in said sleeve,
said spindle being slideably mounted in said sleeve,
said drive arm projecting through said slot in said sleeve to drivingly engage said spindle.

* * * * *